Patented Dec. 29, 1953

2,664,428

UNITED STATES PATENT OFFICE 2,664,428

$\Delta^4$-17$\alpha$-HYDROXY-3,20-DIKETO-PREGNEN-21-ALS

Karl Miescher, Rhine, and Julius Schmidlin, Basel, Switzerland, assignors to Ciba Pharmaceutical Products, Inc., Summit, N. J.

No Drawing. Application August 27, 1951, Serial No. 243,914

Claims priority, application Switzerland September 12, 1950

2 Claims. (Cl. 260—397.4)

The present invention relates to $\Delta^4$-17$\alpha$-hydroxy-3,20-diketo-pregnen-21-als and to the preparation thereof. These $\Delta^4$-17$\alpha$-hydroxy-3,20-diketo-pregnen-21-als may contain additional free or functionally converted hydroxy or keto groups, particularly in the 11-position, or may also contain additional double bonds, as for example in the 9,11- or 11,12-position.

$\Delta^4$-17$\beta$-hydroxy-3,20-diketo-pregnen-21-als are already known. In these known aldehydes, the side chain possesses the configuration which results from the reaction of a 17-ketone with, for example, an organometallic compound. Compared with these known substances, the pregnenals of the present invention—and especially $\Delta^4$-17$\alpha$-hydroxy - 3,20 - diketo-pregnen-21-al itself—possess very valuable suprarenal cortex hormone activities. For medical use the new compounds are transformed into tablets or injectable solutions.

The $\Delta^4$-17$\alpha$-hydroxy-3,20-diketo-pregnen-21-als of the present invention are obtained by reacting an organic nitroso compound with a quaternary $\Delta^4$-17$\alpha$-hydroxy-3,20-diketo-pregnen-21-yl-ammonium compound, and then liberating the desired aldehyde from the nitrone thus obtained.

As starting materials there are employed especially quaternary ammonium salts which are derived from heterocyclic bases of aromatic character, such as pyridine, quinoline and isoquinoline. These starting materials are obtained by reaction of the appropriate tertiary amine with an ester of the corresponding 21-hydroxy-pregnene compound and a strong inorganic acid, such as a hydrohalic acid or an organic sulfonic acid. For the interaction with the quaternary ammonium salt, use is preferably made of a nitroso compound of the aromatic series, such as nitrosobenzene and dialkylamino-nitroso-benzenes, for example p-dimethylamino-nitroso-benzene. The production of the nitrones takes place in the presence of an alkaline agent. Surprisingly, the condensation may be carried out in excellent yield even in the presence of a bicarbonate of an alkali metal, as for example potassium bicarbonate. From the nitrone obtained according to this process, the aldehyde may be liberated by treatment with an acid agent. The same result is achieved however also by reaction with a carbonyl compound, such as pyroracemic acid.

The following examples illustrate the invention, the relation between parts by weight and parts by volume being the same as that between the gram and milliliter.

*Example 1*

4.90 parts by weight of $\Delta^4$-17$\alpha$-hydroxy-3,20-diketo-pregnen-21-yl-pyridinium bromide:

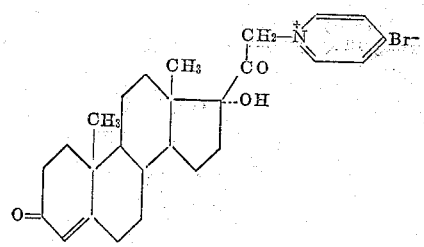

and 1.55 parts by weight of p-nitroso-dimethyl-aniline are dissolved in 150 parts by volume of methanol with addition of 100 parts by volume of water and mixed with a solution of 1.02 parts by weight of potassium bicarbonate in 50 parts by volume of water. After being kept for 6 days at room temperature with occasional agitation, the small red plates which have separated are filtered off with suction, washed with 50 per cent. methanol and then dried. By recrystallization from methylene chloride-methanol, there is obtained the pure ($\Delta^4$-17$\alpha$-hydroxy-3-keto-aetiocholenoyl)-N-(p-dimethylamino-phenyl)-nitrone of the formula:

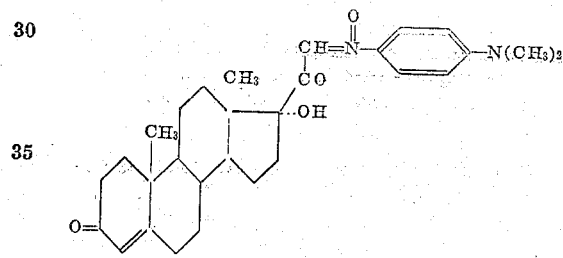

which melts at 180–182° C. (with decomposition).

4.80 parts by weight of the thus-obtained ($\Delta^4$-17$\alpha$-hydroxy - 3 - keto - aetiocholenoyl)-N-(p-dimethylamino-phenyl)-nitrone are covered with 2500 parts by volume of ether and the suspension shaken for 2 hours with 500 parts by volume of 1-normal hydrochloric acid. The aqueous phase is then separated off and the ether solution washed consecutively with 1-normal hydrochloric acid, water, 2 per cent. sodium bicarbonate solution and water. The aqueous extracts, before being discarded, are extracted several times with ether. The dried ethereal solution is gradually evaporated to about 20 parts by volume whereby in most cases crystallization begins without seeding. The practically colorless substance thus obtained is easily isolated by suction filtration, and is then washed with ether. In this way, there is obtained $\Delta^4$-17a-hydroxy-3,20-diketo-pregnen-21-al:

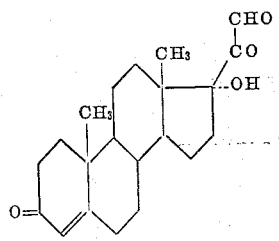

as a hydrate which melts at 105–108° C. (with decomposition) and which has the rotation $[\alpha]_D^{26} = +111 \pm 2°$ (C=1.036 in dioxane).

In analogous manner $\Delta^{4,9,11}$- and $\Delta^{4,11}$-17a-hydroxy-3,20-diketo-pregnadiene-21-al are prepared.

The $\Delta^4$-17a-hydroxy-3,20-diketo-pregnen-21-yl-pyridinium bromide, used as starting material in this example, is prepared for instance as follows:

1.85 parts by weight of finely powdered $\Delta^4$-17a-hydroxy-3,20-diketo-21-bromopregnene:

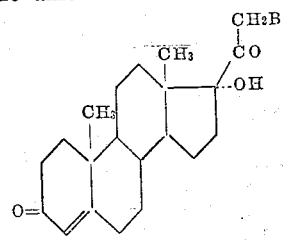

are mixed with 7.5 parts by volume of dry pyridine and maintained for 24 hours at room temperature with occasional stirring. The excess of pyridine is then distilled off as completely as possible under reduced pressure, the formed crystallizate stirred with 4 parts by volume of methanol and, after 2 hours, the mother liquor filtered with suction followed by washing of the collected crystals with a little ice cold methanol. By recrystallization from boiling methanol, the pure pyridinium salt is obtained as colorless flat prisms which melt at 285–287° C. (with decomposition and brown discoloration above 178° C.).

The aforementioned 21-bromo-pregnene itself can be obtained for example by treatment of $\Delta^{4,17}$-3-keto-21-bromo-pregnadiene with hydrogen peroxide in the presence of osmium tetroxide.

*Example 2*

21.9 parts by weight of $\Delta^4$-17a-hydroxy-3,20-diketo-pregnen-21-yl-pyridinium chloride:

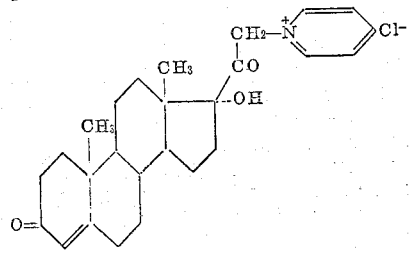

and 7.50 parts by weight of p-nitroso-dimethylaniline are dissolved in 600 parts by volume of methanol with addition of 400 parts by volume of water, and the resultant solution admixed with a solution of 4.08 parts by weight of potassium bicarbonate in 200 parts by volume of water. The further working up follows as described in Example 1. The ($\Delta^4$-17a-hydroxy-3-keto-aetiocholenoyl)-N-(p-dimethylamino-phenyl)-nitrone obtained is identical with that described in Example 1.

2.40 parts by weight of finely powdered pure ($\Delta^4$-17a-hydroxy-3-keto-aetiocholenoyl)-N-(p-dimethylamino-phenyl)-nitrone are suspended in 500 parts by volume of ether and shaken with a solution of 8.80 parts by weight of pyroracemic acid in 250 parts by volume of water for 10 days in a nitrogen atmosphere. The ether solution is then separated from the dark red aqueous layer, the latter being further twice extracted with fresh ether before being discarded. The ether solutions are then washed consecutively with water, 2 per cent. sodium carbonate solution and water, then combined and dried with sodium sulfate. By carefully distilling off the ether, there is obtained the $\Delta^4$-17a-hydroxy-3,20-diketo-pregnen-21-al as the hydrate which melts at 105–108° C. (with decomposition) as described in Example 1.

The $\Delta^4$-17a-hydroxy-3,20-diketo-pregnen-21-yl-pyridinium chloride used as starting material in this example is prepared, for instance, as follows:

6.93 parts by weight of $\Delta^4$-17a,21-dihydroxy-3,20-diketo-pregnene-(Reichstein's Substance S):

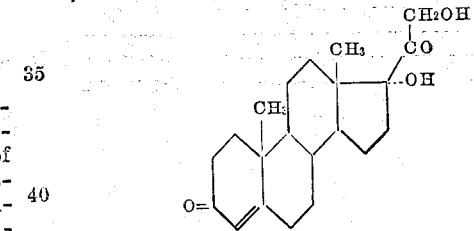

are dissolved, with exclusion of moisture, in 50 parts by volume of dry pyridine, 4.80 parts by weight of pure p-tosyl chloride added and, after agitation for a short time, the reaction mixture kept for 12 days in the dark. Then excess pyridine is removed under reduced pressure at room temperature, the formed crystals stirred with 40 parts by volume of acetone and, after several hours' standing, the crystals isolated by suction filtration. By recrystallization from methanol, while decolorizing with activated carbon, and by displacing the methanol by means of 96 per cent. ethanol, the pure pyridinium is obtained from the crude salt mixture as colorless platelets which melt at 304–307° C. (with decomposition).

What is claimed is:
1. A $\Delta^4$-17a-hydroxy-3,20-diketo-pregnen-21-al.
2. $\Delta^4$-17a-hydroxy-3,20-diketo-pregnen-21-al.

KARL MIESCHER.
JULIUS SCHMIDLIN.

References Cited in the file of this patent

UNITED STATES PATENTS

| Number | Name | Date |
|---|---|---|
| 2,275,790 | Miescher | Mar. 10, 1942 |